Nov. 3, 1959     F. KOCKS     2,911,030
APPARATUS FOR MAKING SLOTTED TUBES
Filed Aug. 2, 1956
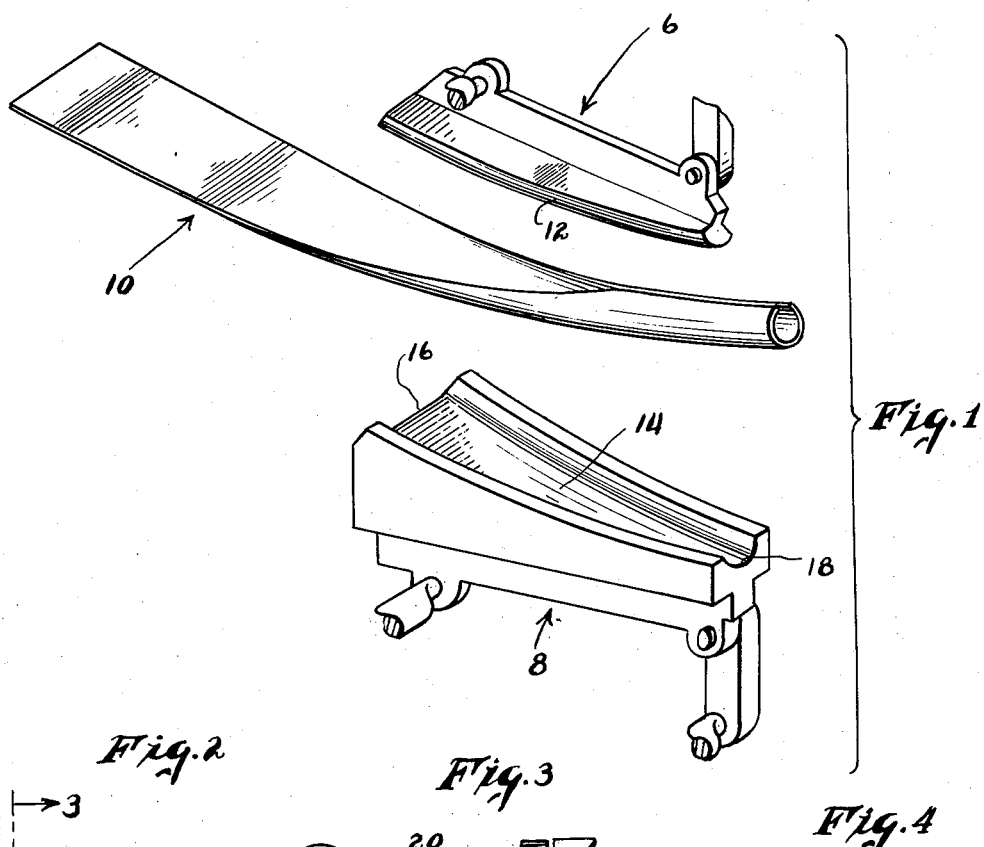
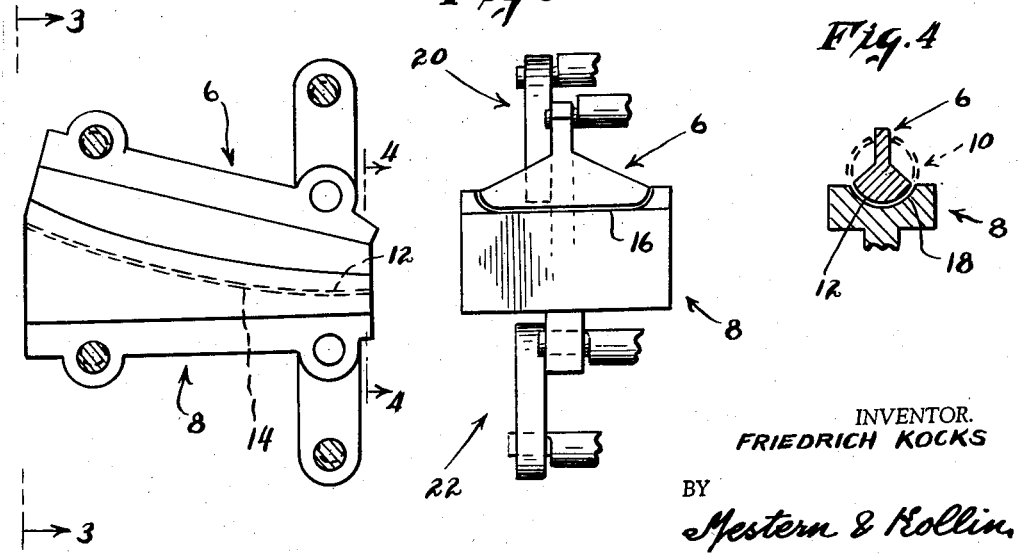
INVENTOR.
FRIEDRICH KOCKS
BY
*Mestern & Rollin*
ATTORNEYS

United States Patent Office 2,911,030
Patented Nov. 3, 1959

2,911,030

APPARATUS FOR MAKING SLOTTED TUBES

Friedrich Kocks, Dusseldorf, Germany

Application August 2, 1956, Serial No. 601,780

Claims priority, application Germany August 8, 1955

4 Claims. (Cl. 153—32)

In the specification of a prior co-pending application Ser. No. 575,127, filed March 30, 1956, the applicant has described an apparatus for forming slotted tubes in a continuous process by bending a strip of metal, in which the strip is passed between a pair of jaws which are oscillated so as continuously to open and close and, at the same time, to feed the strip forwards. The jaws are so arranged that, when they are nearest together, they enclose between them a gap which runs in a straight line and are spaced apart by a distance which corresponds to the thickness of the strip to be bent. The jaws, one of which enters into the other, are so shaped that the cross-section of the gap between them gradually decreases in lateral width from the entry end to the outlet end where the cross-section corresponds to that of the part of the finished slotted tube opposite the slot, the strip being gradually deformed between the jaws into a tube. One of the jaws is in the form of a more or less flatly arched channel, the curved sides of which gradually approach one another from the entry to the outlet end, the center line of the channel being in a straight line.

When tools having jaws of this nature are used, the result is that the center line of the strip which is deformed between the jaws remains unaltered but the strip is increasingly stretched towards both of its edges because, when the side edges are bent up from the flat strip to form the slotted tube, they have to traverse a longer path than the neutral fibers in and adjacent the center of the strip. This stretching of the edges of the strip is undesirable as the effect of it is that the tube, when it emerges from the jaws, bends towards the side opposite the slot.

The object of the invention is to avoid this undesirable curving of the tube when a strip is bent into the form of a slotted tube with tools of the aforesaid kind, and to produce straight tubes. This result is obtained in accordance with the invention by forming the jaws in such a manner that, instead of enclosing a gap or pass which runs in a straight line, they enclose a gap which is curved in the plane of oscillation of the jaws, the working surface of the outer tool being concavely curved in this plane and the working surface of the inner tool being convexly curved to the same extent. This curvature, which runs in the axial direction of the pass between the jaws, has the result that the strip deformed between the jaws, is stretched not only at its edges but also over its entire width, and on leaving the jaws is no longer subject to stresses which cause distortion. The curvature of the jaws necessary to produce a straight tube can be easily calculated or determined by experiment.

The aforesaid prior apparatus and an apparatus in accordance with the invention are illustrated, in the accompanying drawing.

In the drawings—

Fig. 1 is an exploded view in perspective of the apparatus;

Fig. 2 is a side elevation of the die assembly in closed position;

Fig. 3 is a rear elevation of Fig. 2 taken on line 3—3 of Fig. 2 and

Fig. 4 is a section view taken on line 4—4 of Fig. 2.

As will be seen from the drawings, the apparatus comprises an upper jaw 6 and a lower jaw 8, the jaws when closed forming therebetween a pass for the travel of a metal strip 10. Jaw 6 is formed with a convex curvature 12, while jaw 8 is formed with a concave curvature 14. The jaws thereby enclose a curved gap between them, the cross-section of which changes along the axial length of said jaws from a substantially flattened curve 16 to a partly circular curve 18. As has been noted above, the upper jaw 6 has a convex complementary curvature 12, and the lower jaw a concave curvature 14 corresponding thereto in a vertical plane along the axial length of the jaws.

There are provided eccentric means 20 for rockably mounting thereon the upper jaw in the vertical plane referred to above, and eccentric means 22 for rockably mounting the lower jaw, and drive means (not shown) for both said eccentric jaws.

Through the operation of the jaws in this manner, the strip is fed forward while being bent into a slotted tube.

I claim:

1. Apparatus for the continuous manufacture of slotted tubes from metal strips, said apparatus comprising an upper jaw and a lower jaw, said jaws forming therebetween a pass for the travel of said strip, one of said jaws having a convex curvature and the other of said jaws having a concave curvature, said jaws thereby enclosing a curved gap between them, the cross-section of which changes along the axial length of said jaws from a substantially flattened curve to a partly circular curve, said upper jaw having a convex curvature and said lower jaw having a complementary concave curvature corresponding thereto in a vertical plane along said axial length, first eccentric means for rockably mounting thereon said upper jaw in said vertical plane and drive means for the eccentric means; second eccentric means for rockably mounting thereon said lower jaw in said vertical plane and drive means for the second eccentric means, said eccentric means being operative in rocking said jaws in the vertical plane so as to open and close them continually, whereby said strip is fed forward while simultaneously being bent into a slotted tube.

2. The apparatus according to claim 1, wherein said means operative in opening and closing said jaws are also operative in feeding said strip forward at the time when said jaws are closed.

3. The apparatus according to claim 1, wherein said jaws are mounted at one end on said eccentrics and at the opposite end on links connected to said eccentrics.

4. In the apparatus as claimed in claim 1, said jaws, when closed, being spaced apart by a distance approximately equal to the thickness of the strip.

References Cited in the file of this patent

UNITED STATES PATENTS

| 1,661,108 | Coates | Feb. 28, 1928 |
| 1,708,872 | Coates | Apr. 9, 1929 |
| 2,145,867 | Fentress | Feb. 7, 1939 |
| 2,405,738 | Dettman | Aug. 13, 1946 |
| 2,700,408 | Babbitt | Jan. 25, 1955 |